May 5, 1942.  G. DAVENPORT  2,282,038

VARIABLE TRIMMER CAM

Filed Oct. 7, 1939  2 Sheets-Sheet 1

INVENTOR
Granger Davenport
BY
Albert F. Nathan
ATTORNEY

May 5, 1942. G. DAVENPORT 2,282,038
VARIABLE TRIMMER CAM
Filed Oct. 7, 1939 2 Sheets-Sheet 2

INVENTOR
Granger Davenport
BY
Albert F. Nathan
ATTORNEY

Patented May 5, 1942

2,282,038

UNITED STATES PATENT OFFICE 2,282,038

VARIABLE TRIMMER CAM

Granger Davenport, Verona, N. J., assignor to Gould & Eberhardt, Newark, N. J., a corporation of New Jersey Application October 7, 1939, Serial No. 298,389

5 Claims. (Cl. 125—11)

The present invention relates to trimmer cams, such as may be used in connection with grind wheel dressing devices, and more particularly to a cam whose contour may be adjusted to effect a modification in the action or rate of action of the cam follower to obtain a desired effect in or on the workpiece operated upon. As will hereafter become apparent a variable contour cam is capable of being used in many environments and the references herein to a wheel dressing device and grinding machine are for the purpose of illustrating a preferred use and typical operation of such a cam.

In wheel dressing devices of a thread grinder, for example, the motions of the diamonds were dependent upon the fixed contour of a solid cam which, of course, could be replaced by others of a digerent angle or fixed shape whenever it was desired to change the contour of the wheel profile. The position of the cams in their holders could also be varied, and likewise adjustments could be made to the systems of levers connecting the cam followers with the diamonds. Adjustments of this character, however, merely altered the slope of the wheel profile and consequently the pressure angle of the worm thread being ground. However, with the prior devices, no means were available to produce a modification in the thread profile, that is, to make a departure from the theoretically correct worm profile in order properly to relate the thread of the worm with the teeth of the complementary worm gear. The only way proper relation could be produced was by repeatedly regrinding the cams or by making new ones.

The regrinding or the making of new cams was not, however, a practical solution because the complex nature of the worm tooth profile renders it almost impossible to assign beforehand, the proper shape to the grind wheel trimmer cam. The primary aim of the present invention is to render available a cam plate so constructed that after it is made, its guiding edge or surface may be slightly modified to suit any conditions or changed condition that may be encountered in the environment in which it is to be used.

Still another objective of the invention is to reduce to minimum proportions the cost of manufacture of a trimmer cam suitably for a given purpose or operation by providing a cam whose follower engaging surface may be modified after installation to suit a given condition, and from which a record may be made of the precise form of cam required for that condition. Recurring conditions of the same order may thus be efficiently and expediently met, without laborious and expensive periods of experimentation.

In realizing the aims of the invention it is proposed to provide a trimmer cam whose roller engaging surface is normally rigid and finished in the same way as the prior solid cams, but which surface is infinitely adjustable so that slight modifications may repeatedly be made in the contour of the working face as the need requires. In this way the expensive and tedious "cut-and-try" methods of the prior fixed-profile cams is avoided, and likewise the expensive necessity of a large collection of fixed contour cams. The present concept of an infinitely variable but normally fixed contour cam enables the user accurately and efficiently to introduce various modifications in cam contour whereby it is now possible to overcome the very definite limitations and practical difficulties heretofore experienced in the form and construction of the prior solid cams.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 5:
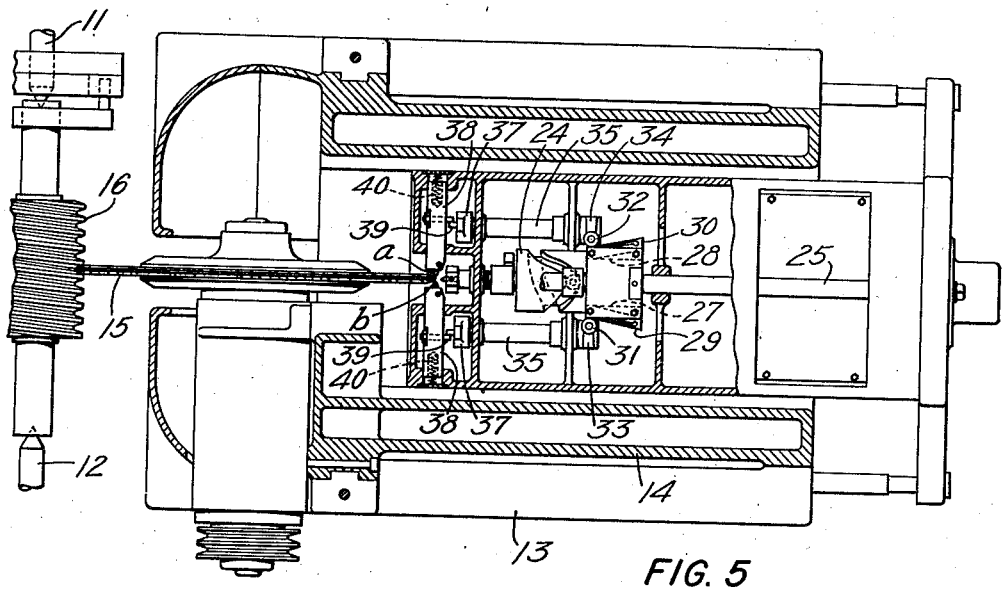

Fig. 5 of the drawings is a plan view, partly in section, of a portion of a grinding machine embodying a cam constructed in accordance with the present invention.

Figure 6:
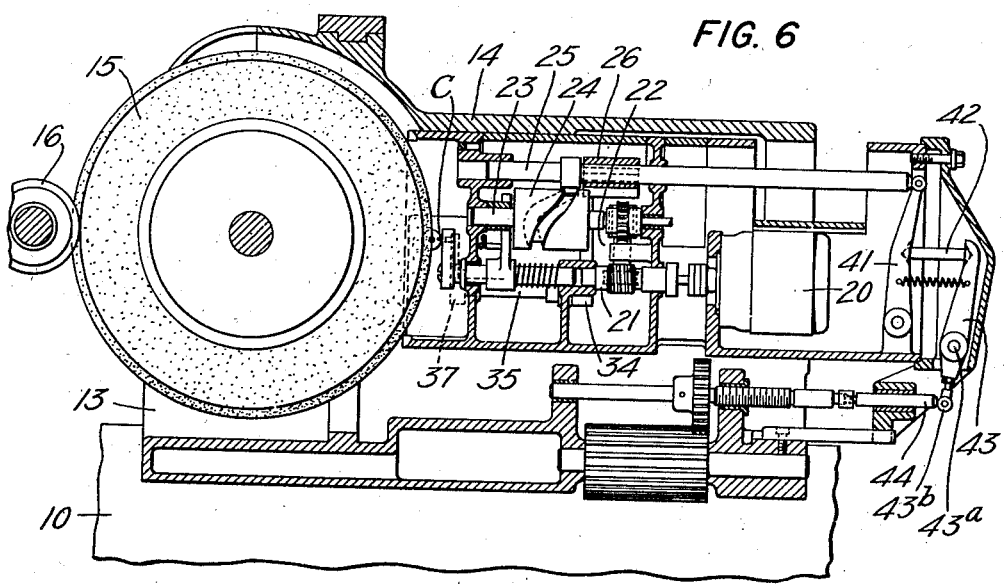

Fig. 6 is a side elevation thereof also partly in section.

The grinding machine depicted in Figs. 5 and 6, as illustrative of a machine in which the present invention is useful, is of well known manufacture and need not, it is believed, be explained in great detail. Suffice it to say that it comprises a base 10 which supports the work centers 11 and 12 and the reciprocable wheel slide 13.

The wheel slide 13 has fitted therein a revolvable carriage 14 on which is mounted the grinding wheel 15. The normal plane of the wheel is coincident with the axis of rotation of the carriage 14 and may be inclined to one side or the other in accordance with the helix angle of the thread of the worm 16 to be ground. It will be understood that during the grinding operation the worm 16 is rotated by power and simultaneously fed axially, in accordance with the lead of its thread, so that the entire thread is progressively brought into engagement with the grind wheel.

To maintain accuracy in the ground thread, frequent dressing of the wheel profile is required and in the present machine the dressing is effected by three diamond points a, b, and c. Points a and b dress the side flanks of the wheel and point c dresses the peripheral face.

The motions of the diamonds are controlled from within the main carriage 13 by mechanisms which include the small motor 20 illustrated in Fig. 6. The motor 20 operates a worm shaft 21 which through worm gearing, indicated generally as 22, operates a cam shaft 23. The cam shaft 23 carries a barrel cam 24 which, in turn, cyclically reciprocates a trimmer cam shaft 25. On the shaft 25, a cam carrier 26 is mounted and which is provided with lateral apertures 27 and 28 for receiving the trimmer cams 29 and 30. Follower rollers 31 and 32 are carried at the ends of levers 33 and 34 and operate against the outer faces of the trimmer cams as the latter reciprocates, and impart a rocking motion to the levers.

The lower end of each of the levers is secured to a shaft 35, which has at its other end a diamond holder operating lever 37. Each of the lateral diamonds is mounted in a spring pressed holder 38, which through the abutment 39 is moved away from the wheel by the lever 37, and toward the wheel by the spring 40.

The mechanism just described imparts an in-and-out motion to the diamonds, whereas, the motion radially of the wheel is effected by the lever system which includes the parts 41, 42, 43, and 44. Further detailed description of the machine is believed unnecessary inasmuch as the machine per se forms no part of this invention.

The in-and-out motions of the diamonds and their radial motions are, it will be seen, operated from a common source, but through relatively independent trains of mechanisms. In each train there are means provided for varying the relative rates of the two types of motions. The relative rate of motion of the in-and-out train may be changed by increasing or decreasing the slope of trimmer cams 29 and 30, or by adjusting the follower rollers 31, 32 in or out on their respective levers 33, 34 to thereby change the arc of swing of the levers and so effect a corresponding change in the position of the diamond points with relation to any given position thereof radially of the wheel.

Likewise, with the radial motion mechanism, the roller 43b may be adjusted toward or away from the axis 43a of the lever 43, thus changing the effective lever arm and producing a corresponding change in the rate of radial motion of the diamonds relative to their lateral motions (in-and-out).

Such adjustments, however, merely change the direction of the line or path of the diamond points so that the two will define a slightly wider or narrower included angle. Such adjustments also permit a steeper angle on one wheel flank than on the other for special forms of threads.

None of the usual adjustments, however, permits any departure from the original character of motions and the only way a modification could be obtained was to regrind the faces of the trimmer cams 29 and 30. This was not only expensive, as it rendered the deformed cams useless thereafter, but was exceedingly difficult of attainment because of the involved nature of the motion imparted to the follower resulting as is does from two cyclically timed transverse motions.

The present invention undertakes to provide a trimmer cam that may be modified repeatedly to suit a change in the conditions of use, or altered in a corrective manner to meet new conditions, and which may be arranged to cooperate with any suitable follower, whether the follower or cam alone, or both cam and follower, be actuated in effecting a given character of motion to a tool or other instrumentality.

That end may be achieved efficiently and economically with the aid of an infinitely variable but normally fixed type of cam which could be so adjusted as to superpose on all other available adjustments, still further modifications in the motion of the follower along various regions of the cam. That is to say, by this invention, the follower may be given an accelerated rate of motion through a given portion of its travel on the cam, and a decelerated motion at other portions of its travel, and so correspondingly produce a change in the rate or motion of the ultimate element of the train.

Modifications in the contour of the wheel flanks to compensate for reduction in wheel diameter; creating a specific form of tooth profile shape on worms to match the tooth profile of complementary worm gears, and other corrective or selected variations in the finished form of the workpiece, are but a few of the advantages attained by the use of a cam of this character in a grinding machine.

Figures 1, 2:
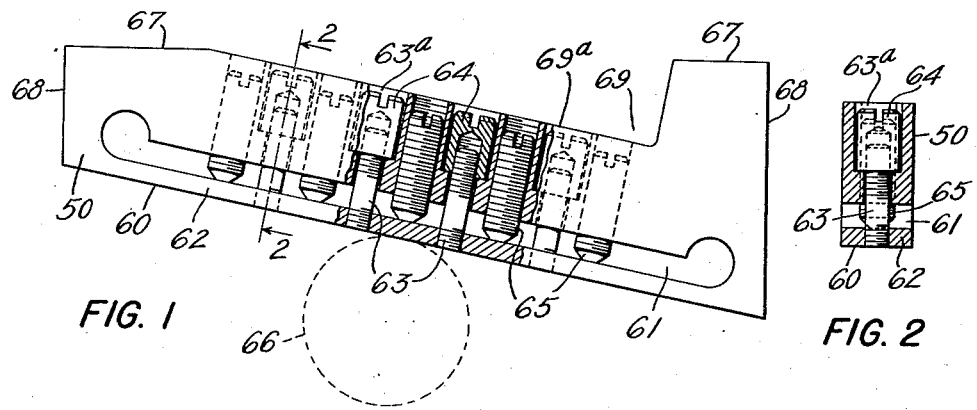
Figure 1 is a plan view of a trimmer cam embodying the present invention.
Fig. 2 is a transverse sectional view along line 2—2 of Fig. 1.

Figs. 1 and 2 illustrate a preferred manner of constructing a trimmer cam 50 in accordance with this invention, which consists in forming a flat plate member with an outer edge 60 normally straight and sloped, when necessary, at the proper angle to suit the environment of use.

Adjacent the cam edge 60, a relatively long slot 61 is formed in the plate. The ends of the slot are closed, and at a plurality of intermediate points, the strip 62, severed by the slot, is secured to the main plate by a number of screw studs 63. The studs are secured in the strip flush with the outer surface thereof and pass through enlarged counterbored holes 63a in the main body of the cam where they are capped by nuts 64. Between each pair of the studs 63, push screws 65 are located, each of which has a threaded connection with the main body and an abutting engagement with the inner surface of the strip 62. Operating the screws and nuts, one against the other, will therefore impart a movement to the strip and effect a clamping of the strip 62 definitely in a predetermined position relative to the main body.

Figure 3:
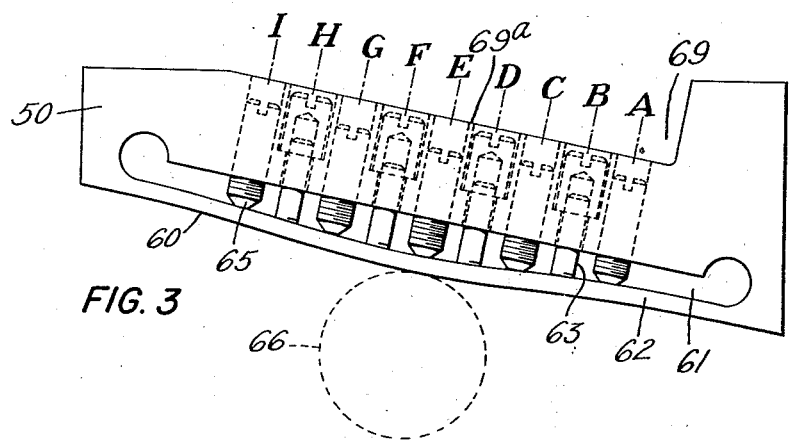
Figs. 3 and 4 are diagrams of a cam with its roller engaging edge flexed to obtain a preselected contour.
Figure 4:
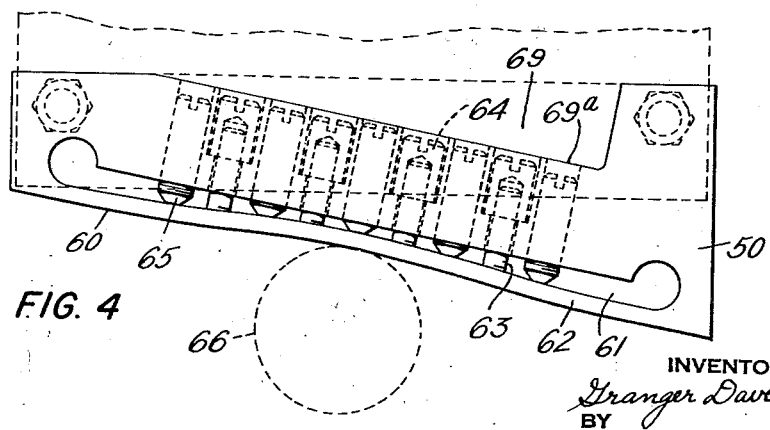

Fig. 1 illustrates the cam with its roller engaging edge 60 disposed in a straight line, such as would impart a uniform motion to the follower, represented by the circle 66. However, when the conditions of the work at hand require some modification in the motion of the follower, for example, to modify particular regions of the worm tooth profile in the illustration herein given, the cam edge 60 may be extended further from the main body at one or more regions and if necessary withdrawn in others. The position of the edge 60, in Figs. 3 and 4, illustrates in an exaggerated way the variable nature of a cam of this character.

In constructing a cam in accordance with this invention, the outer edge 60 will, of course, be finished parallel or inclined as the needs require, relative to the inner edge 67, and the ends 68 finished in a manner suiting the installation. In the specific example herein, the cam is generally triangular and has been notched out, at 69, at its rear to afford a convenient starting surface 69ª for the drilling and tapping of the holes for the adjusting screws 63, 64, 65.

The primary purpose for the notching out of the back of the cam is to bring the edge 69ª in substantial parallelism with the edge 60 and perpendicular to the axes of the adjusting screws 64—65, so as to serve as a base line from which the extent of adjustment given to the edge 60 may be measured. Each point of adjustment may be given an indicia mark such as A, B, C, D, etc., from which a record may be made of the micrometer distance across the plate at the respective markings which will not only indicate the extent of readjustment made to any given section of the cam edge, but which will serve as a record whereby the reestablishment of a given precise contour may be attained at any future date.

All of the adjusting screws are countersunk in the body of the cam plate and are of such length as never to project above the plane of the edge 69ª in any adjusted position of the edge 60 so that precision measurements at the indicia markings may be made without interference.

The cam, in its entirely is of simple one-piece construction whereby a continuous and uninterrupted edge is presented to the follower in any and all positions to which it may be adjusted. And when an adjustment, proper for a given operation has been obtained by manipulating the screws 64 and 65, a suitable record thereof may be made for the future. In this way, a single cam has been provided for producing in a precise manner not only one effect but a number of different effects, without the necessity of making numerous cams and numerous grindings of each cam.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A cam for variably controlling the rate of movement of a cam follower comprising a member having its outer edge finished to cooperate with a cam follower and its inner edge disposed normally equidistant therefrom; said member having a slot therein adjacent the said finished edge thereby physically separating the major portion of the member into a relatively thin flexible follower engaging edge portion and a relatively heavy and inflexible main body; said slot being closed at its ends and extending the major part of the length of the said finished edge; and a plurality of screw means operatively connecting said separated portions of the member for flexing regions of said relatively thin edge portion selectively toward or away from the main body portion of the member to effect a predetermined departure from the initial contour of said finished edge; and means including said inner edge for measuring the extent of adjustment given to said regions of the finished edge relative to the said inner edge.

2. An infinitely variable normally fixed cam element for a machine tool comprising a one-piece member having one normally straight edge adapted to cooperate with a cam follower of the machine; said member having an elongated closed ended slot formed therein adjacent the straight edge thereby separating the major portion of the member into a relatively thin follower engaging edge portion and a relatively heavy body portion; push and pull screw means operatively connected with said two separated portions of the member for physically flexing a part of said thin edge portion out of said straight line position selectively toward or away from the main body portion of the member thereby to effect a variation in the contour of said follower engaging edge portion; and means including said push and pull screw means for locking said relatively thin edge portion of the member in adjusted position relative to the said body portion.

3. A cam for variably controlling the rate of movement of a cam follower comprising a one-piece member having one longitudinal edge and adapted to cooperate with a cam follower; said member having a slot formed therein adjacent the said edge thereby physically separating the member into a relatively thin follower engaging flexible edge portion and a relatively heavy inflexible body portion; said slot being closed at its ends and extending the major part of the length of the member so that the effective part of the follower engaging edge portion is physically separated from the main body of the member and integrally connected thereto at its ends; and a plurality of screw means threaded through the inflexible main body portion of the member in the general plane thereof and operatively connected with said flexible edge portion for flexing said edge selectively toward or away from the main body portion of the member to impose a predetermined curvature on a selected portion or region of said edge relative to the main body of the cam.

4. A variable plate-cam assembly unit adapted for bodily insertion in and removal from cooperative relation with a follower member of a mechanism comprising a unitary member having a flexible outer marginal surface adapted to coact with a cam follower member and an inflexible inner marginal surface physically spaced therefrom and normally disposed substantially parallel to the said flexible surface; means provided wholly by the cam assembly per se for varying the contour of a selected portion of the said flexible outer surface of the assembly relative to the said inner inflexible surface thereof and for holding same in adjusted position; and means including indicia markings adjacent said inner inflexible surface of the cam unit for charting the contour of or measuring the extent of deviation in contour imparted to said follower engaging flexible surface by the said means relative to a known contour previously held thereby.

5. A worm thread grinding machine embodying means for dressing the grinding wheel and in which the wheel dressing element is given a motion radially of the wheel and simultaneously axially thereby to generate a predetermined contour on the wheel flank, the combination of a bodily removable cam element, said element having a base portion and a relatively thin flexible edge portion connected therewith, said base portion of the cam element affording means for clamping the element in the machine with the flexible edge portion operatively related and associated with a cam follower of the machine as to control the relative rates of radial and axial motion of said dressing element and thereby the angularity of the line of motion of the dressing element; means for effecting relative rectilinear movement between the said cam element and said follower to effect a wheel dressing operation; and means provided solely by the removable cam element per se selectively operable to change the contour of a selected portion of said thin flexible edge relative to said base portion thereby to effect a variation in follower motion through a selected part of its stroke and a corresponding change in the contour generated on the wheel, said last mentioned adjusting means being independent of the means for clamping the cam element in position in the machine and independently of the means for effecting said rectilinear movement between the cam element and the cam follower of the machine.

GRANGER DAVENPORT.